United States Patent [19]

Demarest, Jr.

[11] 3,771,984
[45] Nov. 13, 1973

[54] METHOD OF FORMING HIGH-MELTING GLASS RIBBON

[75] Inventor: Henry M. Demarest, Jr., Natrona Heights, Pa.

[73] Assignee: PPG Industries, Inc., Pittsburgh, Pa.

[22] Filed: Feb. 1, 1972

[21] Appl. No.: 222,627

[52] U.S. Cl.......................... 65/97, 65/195, 65/202, 65/346
[51] Int. Cl............................................. C03b 17/00
[58] Field of Search ................. 65/23, 27, 202, 342, 65/344, 345, 346, 347, 340, 97

[56] References Cited
UNITED STATES PATENTS

| | | | |
|---|---|---|---|
| 3,399,046 | 8/1968 | Longenecker | 65/340 |
| 1,591,179 | 7/1926 | Myers | 65/27 X |
| 3,617,234 | 11/1971 | Hawkins et al. | 65/134 X |
| 3,397,976 | 8/1968 | Hynd | 65/344 |

Primary Examiner—Arthur D. Kellogg
Attorney—Russell A. Eberly

[57] ABSTRACT

High-melting glass is formed in apparatus comprising a V-shaped diverter member that is located in the canal of a melting tank, adjacent to the exit lip, with glass passing from the exit lip to a pair of forming rolls. The V-shaped member diverts the volatile-impoverished, silica-rich and somewhat scummy surface layer of the glass toward the sides of the canal, and it consequently passes into the edge portions of the ribbon formed by passage through the forming rolls, being eliminated from the product by edge trimming. In roll-forming a high-melting glass or other glass of high volatiles content, the invention is considerably more advantageous than prior-art practices, causing smaller losses of good glass and smaller heat losses, although the equipment involved is less costly to construct and maintain than that of the prior art.

12 Claims, 2 Drawing Figures

PATENTED NOV 13 1973 3,771,984

METHOD OF FORMING HIGH-MELTING GLASS RIBBON

BACKGROUND OF THE INVENTION

1. Field of the Invention

This invention relates to the forming of glasses that melt at high temperatures or contain a substantial proportion of relatively volatile ingredients. In particular, the invention relates to the forming of such glasses into sheet or ribbon form by a continuous roll-forming operation. It concerns the problem that such glasses have a considerable tendency to develop a surface portion that is impoverished in volatiles content and rich in silica, so that such surface is somewhat scum-like.

2. Description of the Prior Art

The tendency of glass to develop a silica-rich and somewhat scum-like surface layer is well known to those skilled in the art. One example of a way of dealing with this problem in the making of flat glass is the practice in Wright U.S. Pat. No. 2,049,600, in accordance with which there is provided a member that retards the silica-rich surface layer, keeping it from joining the glass that passes to the forming operation (a drawing of sheet in the case of the Wright patent). In accordance with the practice of the Wright patent, the retarding member is raised periodically, to permit the silica-rich glass to pass to the forming operation and be flushed out of the system. The practice of this patent necessarily involves discarding the entire ribbon for a certain period of time. Moreover, though its practice may yield satisfactory results for the forming of ordinary soda-lime glass, such a practice is hardly to be expected to be able to deal adequately with the relatively more severe problem of this kind that is encountered when an attempt is made to roll-form a relatively high-melting glass or glass-ceramic composition, or a lower-melting similar composition with a high volatiles content.

U.S. Pat. No. 3,232,731 teaches a practice of diverting the silica-rich glass into quiescent pools at the sides of the canal, prior to a forming operation, with the glass being removed then from the quiescent side pools and culleted. This practice involves the use of equipment that is relatively costly to install and maintain and it leads to not only relatively larger losses of good glass but also higher heat losses. When an attempt is made to deal with high-melting glass in this way, it becomes necessary to provide burners to make up the heat losses, to the extent that there is the danger, if not the actuality, of damage to the refractories comprising the tank structure, particularly the basin wall, basin-wall liner, and neighboring steelwork.

U.S. Pat. No. 1,538,215 contains a somewhat similar teaching showing a floater member having a central portion that is located somewhat upstream of its end portions, which are in the vicinity of troughs or tanks that are positioned outside of the furnace to receive the material so skimmed off.

U.S. Pat. No. 3,399,046 shows a roof-suspended skimmer wall. The embodiment shown in FIG. 14 of that patent may be capable, in hindsight, of being used in such a way as to practice the instant invention, though it is apparent from a reading of the patent that the patentee had no such idea.

In Bourgraff et al. U.S. Pat. No. 3,615,332, there is shown a furnace for making float glass wherein there is provided near to the entrance of the canal a cooler that obstructs the flow of glass on the surface. This is distinguishable from the instant invention in several respects. First, the cooler is not located near enough to the forming operation to ensure that siliceous surface scum is diverted to edge portions of that product ribbon, rather than having the opportunity to diffuse back toward the central portion of the ribbon. Second, the cooler is necessarily located in a tank of relatively greater width, just upstream of a channel or canal entrance. Third, the cooler device of the Bourgraff et al. patent is necessarily in contact with the molten glass. The patent contains no teaching of the advantages of the instant invention with respect to avoiding surface-scum ream without substantial losses of heat and of good glass.

SUMMARY OF THE INVENTION

High-melting glass is formed in apparatus comprising a V-shaped diverter member that is located in the canal of a melting tank, adjacent to the exit lip, with glass passing from the exit lip to a pair of forming rolls. The V-shaped member diverts the volatile-impoverished, silica-rich and somewhat scummy surface layer of the glass toward the sides of the canal, and it consequently passes into the edge portions of the ribbon formed by the passage through the forming rolls, being eliminated from the product by edge trimming. In roll-forming a glass-ceramic or a high-melting glass or other glass of high volatiles content, the invention is considerably more advantageous that prior-art practices, causing smaller losses of good glass and smaller heat losses, although the equipment involved is less costly to construct and maintain than that of the prior art.

A DESCRIPTION OF THE DRAWINGS

A complete understanding of the invention may be obtained from the foregoing and following description thereof, taken together with the appended drawings, in which:

FIG. 1 is a schematic plan view of the equipment used in the practice of the instant invention; and FIG. 2 is an elevation view of the equipment of FIG. 1.

DESCRIPTION OF THE PREFERRED EMBODIMENT

Figure 1:
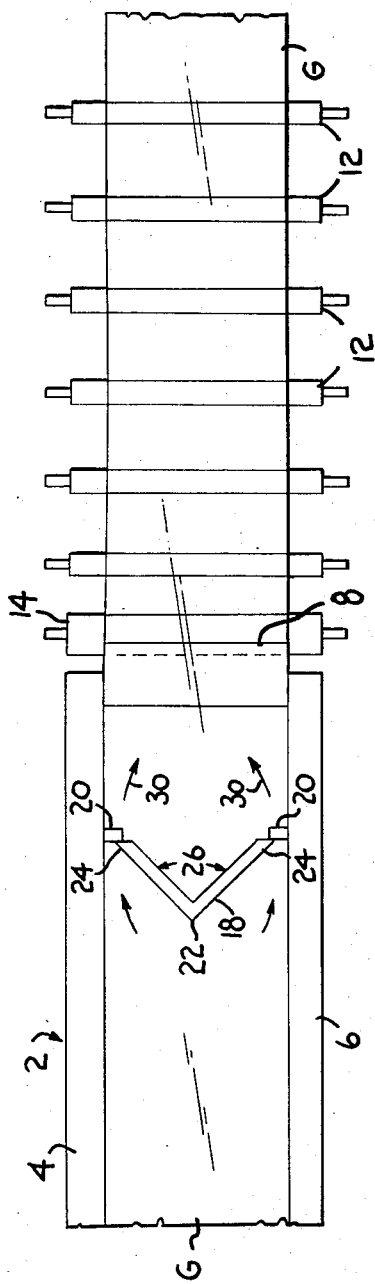

Referring to FIG. 1, there is shown a canal 2 having side walls 4 and 6, together with an exit 8, a lower forming roller 14, and a set of conveyer rolls 12. Similar equipment may be seen in FIG. 2, which shows also the upper forming roll 10 and the bottom 16 of the furnace, as well as the depth of the glass G in the canal 2. The items discussed above are conventional.

In accordance with the instant invention, equipment of the kind described above is further provided with a diverter member 18 and means 20 for securing it in position. In the embodiment indicated schematically in FIGS. 1 and 2, the diverter member 18, comprises a floater of zircon refractory or other suitable material, preferably having in plan view (FIG. 1) a "V" shape, with the apex 22 of the "V" located upstream of the ends 24 of the "V." The angle 26 is preferably on the order of 90° to 120°, although it may range from 60° to 180°. If the depth of the glass in the canal is on the order of 1 to 3 feet, the diverter member 18 extends into the glass to a depth of about ½ to 12 inches. For example, the member 18 may have a total height of 4 inches in its central portion and notches of 1 inch in height being taken from its bottom near the ends of the member 18. Such a member may then be placed so that about ½ to ¾ inch of the above-mentioned height protrudes beneath the level of the molten glass. It is assumed, of course, that the melting operation is conducted with the use of a suitable glass-level control, so that the glass level does not vary by more than about ⅛ inch.

Figure 2:
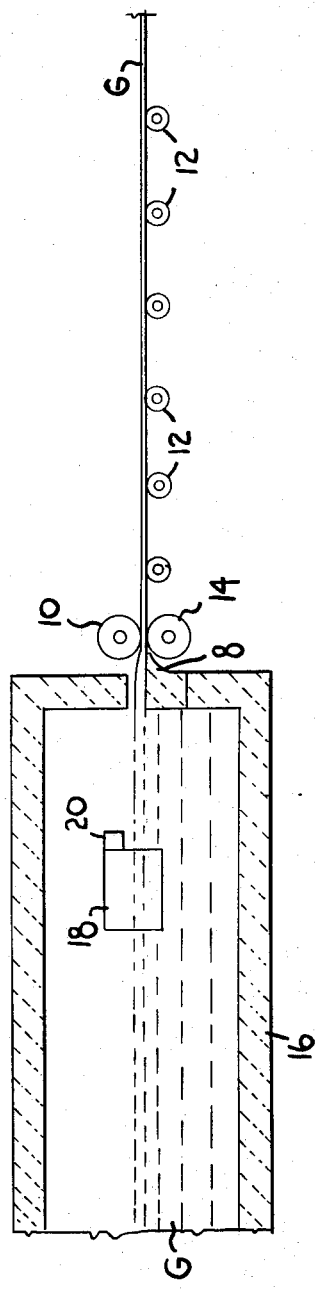

In the arrangement indicated schematically in FIGS. 1 and 2, the means 20 for securing the diverter member 18 in place comprise pieces of metal or refractory that are integral with or secured to the walls 2 and 6 and serve to prevent the member 18 from being carried downstream. Alternatively, if the member 18 is of the bottom-notched kind indicated above, it is satisfactory merely to mount its ends in the tank side walls, taking care to position the member correctly in view of the intended glass level.

Those skilled in the art will readily appreciate that the arrangement discussed above can be modified in many ways without departing from the spirit of the instant invention. The diverter member 18 may be shaped differently, possibly comprising merely an arm extending crosswise of the canal 2 at an angle of 10° to 40°. The diverter member 18 may be made of a partly submerged fluid-cooled metal member, rather than being a member of a refractory; ordinarily, however, it is advisable to avoid the greater heat losses and the danger of explosion that are inherent in such a practice. It is within the scope of the invention to use for the diverter member 18 a member that does not contact the glass, but merely serves to divert the surface layers thereof to one or both edges of the ribbon 26. In this regard, the possibility of using a suitably shaped air-resistance device of the general kind indicated in U.S. Pat. No. 3,617,234 is not to be ruled out, especially if the glass being worked with is not particularly high-melting but is rather one of considerable volatiles content. In using non-contact devices, an important consideration is obtaining adequate service life, considering the necessity of blowing gases at relatively high temperature through such a device in order to avoid creating too great a heat sink.

An important consideration is that, other things being equal, it is necessary to locate the diverter means 18 relatively close to the lip 8, because there is a tendency, indicated by the arrows 30, for the surface portions of the molten glass to move inward as the glass passes downstream of the diverter means 18, and it is accordingly desirable to perform the roll-forming operation before the silica-rich surface layer has had an opportunity to move inward toward the center of the ribbon to such an extent as to increase too greatly the portion of the product ribbon that must be edge-trimmed and discarded.

Accordingly, in most instances, the distance between the downstream ends 24 of the diverter means 18 and the end of the lip 8 is on the order of one to three times the width of the canal 2, and is at most four times the width of the canal from the locus of forming. This may be modified somewhat by appropriately designing the cross-section of the canal 2 so as to create a preferentially greater flow in the central portion thereof.

The invention discussed above may be illustrated with reference to an example involving a forming of a ribbon of a high-melting glass-ceramic composition, such as a glass containing 19 per cent alumina, 1.7 per cent titanium dioxide, 1.4 per cent zirconium dioxide, 0.5 per cent antimony trioxide, 3.8 per cent lithium oxide, 0.60 per cent alkali-metal oxides, 0.1 per cent chlorine, 1.4 per cent phosphorus pentoxide, 1.9 per cent zinc oxide, balance silica (all percentages by weight). Those skilled in the art will readily perceive that other volatiles-containing spodumene-type glass-ceramic compositions may readily and advantageously be handled the same way.

The above-mentioned composition is passed between the forming rolls 10, 14 to produce at a rate of 50 inches per minute a ribbon 0.210 inch thick and about 26 inches wide. Using as the diverter member 18 a water-cooled member barely contacting the top surface of the glass, with the ends 24 spaced about 1 to 3 inches from the side walls of the canal 2 and with the angle 26 being on the order of 130° to 160°, a ribbon was produced satisfactorily with a net width after edge trimming of 20 inches. In these circumstances, glass was discarded from the edge portion at a rate of about two-thirds ton per day. In contast, in previous operations of similar equipment but with the use of skim bays from which glass was continually withdrawn during the forming operation, it was necessary to discard between two and three tons per day in order to obtain an equivalent width of usable ribbon. Manifestly, this prior-art operation or practice involves a considerably greater discarding of glass than would otherwise be good glass. In the prior-art operation, moreover, it was necessary to supply heat through burners to make up for the heat losses occasioned by the skimming operation. The burners not only used fuel but also tended to endanger the service life of tank structure.

In general, the diverter means should extend to between 3 and 15 per cent of the width of the canal from the sides of the canal. As for the angle 26, there is the consideration that as it approaches 180°, the effectiveness of the diversion action tends to be impaired, whereas if it becomes less than about 120°, the lengths of the sides of the member 18 become longer and more difficult to support.

With a ribbon 26 inches wide, the silica-rich material is thus diverted to edge portions of the product ribbon that are at the most about 4 inches wide each, and preferably substantially less, such as about 2 inches each. It is usual in glass-ribbon roll-forming operations to score the ribbon at locations somewhat inboard of the edges and then break off an "edge trim"; in the practice of the instant invention, the edge portions so broken off and culleted are at least wide enough as to cause to be be discarded substantially all of the silica-rich surface portion, leaving a product ribbon of substantially uniform chemical composition. With material of the glass-ceramic composition mentioned above, it is particularly desirable to obtain a product such that the zinc oxide content does not vary more than about 0.5 per cent from one location therein to another; in other words, if the bulk of the material being made has a zinc oxide content of 1.9 per cent, no part of the product should have less than 1.4 weight per cent of zinc oxide.

Though the invention as described above is thought to constitute a substantial advance with respect to the manufacture of flat glass, whatever its composition may be, the invention is of particular usefulness in regard to the roll-forming of a relatively high-melting glass-ceramic material such as that disclosed above. The invention plays an important part in making it possible to obtain sheets of such material through roll-forming rather than the relatively inefficient practice of casting and pressing hitherto more commonly used for such product.

I claim:

1. In the manufacture of flat glass wherein materials are melted to form a bath and glass is continuously withdrawn from said bath and flows in a passage toward a forming means of such nature as to produce a ribbon of product glass, the glass in said passage having a silica-rich surface layer, the step of obstructing a central portion only of said passage to divert silica-rich surface glass toward an edge of said passage while permitting glass of such silica-rich surface layer to pass into edge portions of glass passing the locus of said obstructing, the locus of said obstructing being at most four times the width of said passage from the locus of said forming means so that glass of said silica-rich surface layer becomes contained in said edge portions, and then trimming and removing from said ribbon of product glass said edge portions.

2. A practice as defined in claim 1, characterized in that said product glass comprises a high-melting glass-ceramic composition.

3. A practice as defined in claim 1, characterized in that the step of obstructing the flow of silica-rich surface glass is done by means of a non-contact air-resistance device.

4. A practice as defined in claim 1, characterized in that the step of obtaining the flow of silica-rich surface glass is done by positioning with said passage a member made of refractory material having a central lower portion in contact with said glass.

5. A practice as defined in claim 4, characterized in that said member is made of zircon refractory material.

6. A practice as defined in claim 4, characterized in that said member extends in contact with said glass across said passage and to within 3 to 15 per cent of the width of said passage from the sides thereof.

7. A practice as defined in claim 4, characterized in that said member has an upstream point and laterally extending legs downstream with respect to the flow of glass from said point, said legs meeting at an angle of 120 to 180 degrees when viewed in plan.

8. Apparatus for making flat glass comprising, in combination, container means for receiving glass-making ingredients and for melting them to produce molten glass, glass-forming means for producing a ribbon of flat glass, a passage communicating with said container means and said glass-forming means for leading said molten glass from said container means to said glass-forming means, means for diverting surface portions of said molten glass into edge portions of said ribbon, said diverting means comprising a shaped member extending across a major portion of the width of said passage, said shaped member having its central portion facing said container means extending toward said container means relative to its marginal portions a sufficient distance to cause a substantial amount of said surface portion of molten glass to flow toward said marginal portions, said shaped member having its central, lower portion in contact with said molten glass and said shaped member having its marginal portions above the surface of said molten glass, and means downstream of said glass-forming means for edge trimming and removing said edge portions of said ribbon to yield flat glass from the central portion of said ribbon substantially free of glass of said diverted surface portions.

9. Apparatus as defined in claim 8, characterized in that said means for diverting said surface portion of glass comprises a member of refractory material.

10. Apparatus as defined in claim 9, characterized in that said member is made of zircon refractory material.

11. Apparatus as defined in claim 9, characterized in that said member extends in contact with said glass across said passage and to within 3 to 15 per cent of the width of said passage from the sides thereof.

12. Apparatus as defined in claim 9, characterized in that said member has an upstream point and laterally extending legs downstream with respect to the flow of glass from said point, said legs meeting at an angle of 120° to 180° when viewed in plan.

* * * * *

UNITED STATES PATENT OFFICE
CERTIFICATE OF CORRECTION

Patent No. 3,771,984                 Dated November 13, 1973

Inventor(s) Henry M. Demarest, Jr.

It is certified that error appears in the above-identified patent and that said Letters Patent are hereby corrected as shown below:

Column 5, Claim 4, line 30 "obtaining" should be --obstructing--.

Signed and sealed this 9th day of April 1974.

(SEAL)
Attest:

EDWARD M. FLETCHER, JR.           C. MARSHALL DANN
Attesting Officer                   Commissioner of Patents